(12) United States Patent
Aparecido Castilho et al.

(10) Patent No.: US 11,155,409 B2
(45) Date of Patent: Oct. 26, 2021

(54) TIRE STORAGE DEVICE

(71) Applicant: EMBRAER S.A., São José dos Campos (BR)

(72) Inventors: Juliano Aparecido Castilho, São José dos Campos-SP (BR); Alexandre Filgueiras Cruz, São José dos Campos-SP (BR)

(73) Assignee: EMBRAER S.A., São José dos Campos-SP (BR)

( * ) Notice: Subject to any disclaimer, the term of this patent is extended or adjusted under 35 U.S.C. 154(b) by 182 days.

(21) Appl. No.: 16/472,358

(22) PCT Filed: Dec. 23, 2016

(86) PCT No.: PCT/BR2016/000157
§ 371 (c)(1),
(2) Date: Jun. 21, 2019

(87) PCT Pub. No.: WO2018/112564
PCT Pub. Date: Jun. 28, 2018

(65) Prior Publication Data
US 2019/0367274 A1    Dec. 5, 2019

(51) Int. Cl.
*B65G 1/08* (2006.01)
*B65G 1/14* (2006.01)
(Continued)

(52) U.S. Cl.
CPC .............. *B65G 1/08* (2013.01); *B65G 1/14* (2013.01); *B66D 3/18* (2013.01);
(Continued)

(58) Field of Classification Search
CPC ............ B65D 85/06; B65G 2201/0273; B65G 2201/0241; B65G 1/08
See application file for complete search history.

(56) References Cited

U.S. PATENT DOCUMENTS 2,146,533 A * 2/1939 Erickson ............... B60P 1/4421
                                                414/520
3,407,926 A * 10/1968 Rosser ................... B65D 85/06
                                                206/304

(Continued)

FOREIGN PATENT DOCUMENTS

JP          1-85306          6/1989

OTHER PUBLICATIONS

International Search Report for PCT/BR2016/000157, dated Sep. 21, 2017, 4 pages.

(Continued)

*Primary Examiner* — Mark C Hageman
(74) *Attorney, Agent, or Firm* — Nixon & Vanderhye P.C.

(57) ABSTRACT

The present invention relates to a device for storing tires, particularly large tires, said tire storage device comprising a plurality of storage niches (10) and at least one elevator disposed in a front portion (31) of the device and engaging the plurality of storage niches (10), each storage niche (10) consisting of an inclined upper platform (II), a lower inclined platform (12), and a connecting platform (13) associating the upper platform (11) with the lower platform (12), the upper platform (11) comprising an inlet end of the tire (111) engaging the elevator and a second end (112) opposite the inlet end of the tire (111) engaging the connecting platform (13), the lower platform (12) comprising a first end (121) engaging the connecting platform and an outlet end of the tire (122) opposite the first end (121).

7 Claims, 4 Drawing Sheets

(51) Int. Cl.
*B66D 3/18* (2006.01)
*B66C 1/42* (2006.01)
*B66F 9/07* (2006.01)

(52) U.S. Cl.
CPC ...... *B65G 2201/0273* (2013.01); *B66C 1/422* (2013.01); *B66F 9/07* (2013.01)

(56) References Cited

U.S. PATENT DOCUMENTS

| | | | | |
|---|---|---|---|---|
| 3,753,507 | A * | 8/1973 | James | B65G 1/08 |
| | | | | 414/276 |
| 3,987,915 | A | 10/1976 | Conner | |
| 2012/0027558 | A1 * | 2/2012 | Weeden | B65G 1/02 |
| | | | | 414/800 |
| 2020/0255220 | A1 * | 8/2020 | Bozkurt | B65G 47/46 |

OTHER PUBLICATIONS

Written Opinion of the ISA for PCT/BR2016/000157, dated Sep. 21, 2017, 5 pages.

* cited by examiner

TIRE STORAGE DEVICE

This application is the U.S. national phase of International Application No. PCT/BR2016/000157 filed 23 Dec. 2016, which designated the U.S., the entire contents of which is hereby incorporated by reference.

The present invention relates to a tire storage device, particularly for large tires, that allows the entry and exit of the tire to occur on the same side of the device and provides stored tire movements by gravity, preventing deformation by static storage and ensuring that the first tire entering the storage is the first tire exiting the storage (FIFO).

PRIOR ART DESCRIPTION

For the service of a regional airline with approximately 100 aircraft, a maintenance flow of wheels of the order of 600 tire changes/month is generated that and requires stocks of the order of 1200 tires.

The stocking process of large tires (diameter>600.00 mm) and mass (>50 kg) is usually carried out using: forklifts, which require corridors for them to move, or are horizontal stocks requiring large areas and do not guarantee usage sequencing according to the date of receipt, or are made in air-conditioned containers and/or cages arranged horizontally and vertically wherein, in both cases, large spaces and forklifts are also required, in addition to the fact that the usage sequencing according to date of receipt is not guaranteed either.

Given that they are tires of large dimensions and mass, the storage activity of these tires has potential ergonomic risks to operators and/or slow operations, dependent on equipment and in environments with controlled temperature and lighting.

Other drawbacks observed in the known tire stocking processes are: inefficiency in batch control and FIFO control, thus requiring additional controls; large areas for storage, increasing the cost related to infrastructures; difficulty in handling tires, leading to accidents and requiring the purchase or rental of forklifts; support equipment with combustion engines and high risk of tire handling; and impossibility of rolling the stock tires to avoid deformation.

Document NO. CN 101934912 describes a vertical tire storage unit. This unit consists of multiple tire storage silos formed by a sloped runway to allow the tires to roll, so the silo inlet end is positioned above the outlet end so that the tire shifts under the action of gravity. The silo tracks are independent, so that, a damping device that holds the tire on it—forming a row of tires in each track—is arranged next to the exit of each track.

This storage unit works as a tire "library". Each silo stores a tire type. When a particular type of tire is demanded, it is withdrawn from the silo by the outlet end which is opposite the inlet end, from the release of the damping device. The tire falls on a platform close to the ground to be then removed.

The drawbacks of this storage unit are the impossibility of controlling tire inputs and outputs, making FIFO control impossible, the possibility of obstruction of the device due to the fact that the tires fall on the platform and pass through a vertical flow path until reaching the platform, and also, ergonomic risks of tire handling.

Furthermore, document N°. CN 101934912 does not describe the possibility of using this storage unit for storing large tires.

OBJECTS OF THE INVENTION

Therefore, the object of the present invention is to provide a storage device for large tires, endowed with interconnected ramps and with specific inclinations so as to allow the entrance and exit of the tire of this device to occur on the same side of the device and provide for movement by gravity of the stored tires thus preventing deformation by static storage.

Another object of the present invention further is to provide a large tire storage device comprising a batch control and semi-automatic tire inlet and outlet control, ensuring that the first tire to enter the storage is the first tire exit the storage (FIFO—First in/first out).

BRIEF DESCRIPTION OF THE INVENTION

The present invention relates to a device for storing tires, particularly large tires, said tire storage device comprising a plurality of storage niches and at least one elevator disposed in a front portion of the device and engaging the plurality of storage niches, each storage niche consisting of an inclined upper platform, a lower inclined platform, and a connecting platform associating the upper platform with the lower platform, the upper platform comprising an inlet end of the tire engaging the elevator and a second end opposite the inlet end of the tire engaging the connecting platform, the lower platform comprising a first end engaging the connecting platform and an outlet end of the tire opposite the first end.

BRIEF DESCRIPTION OF THE DRAWINGS

It follows a more detailed description of the instant invention, based on one embodiment represented in the drawings. The figures show.

DETAILED DESCRIPTION OF THE INVENTION

Figure 1:
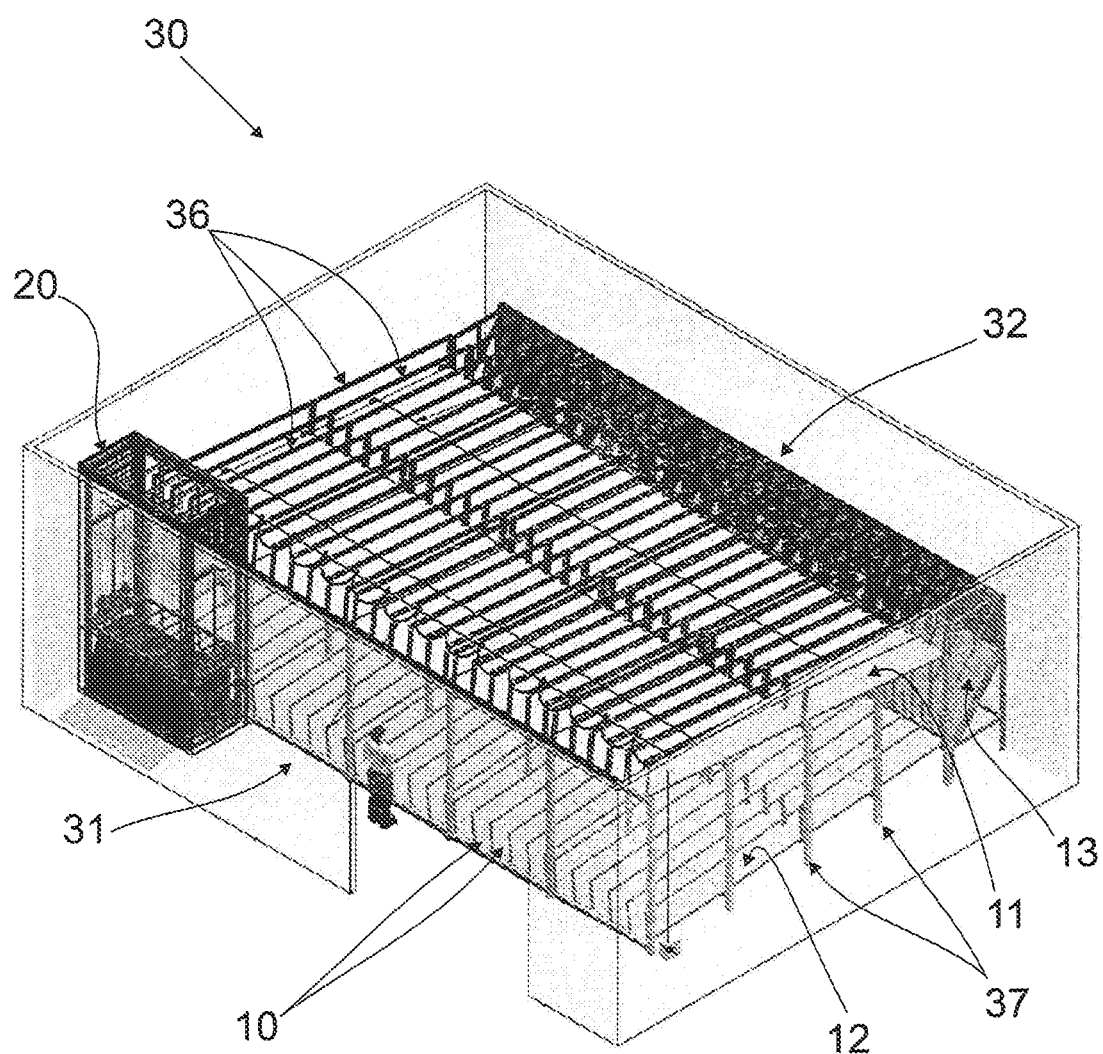
FIG. 1—is a schematic perspective view of the tire storage device subject matter of this invention.
Figure 2:
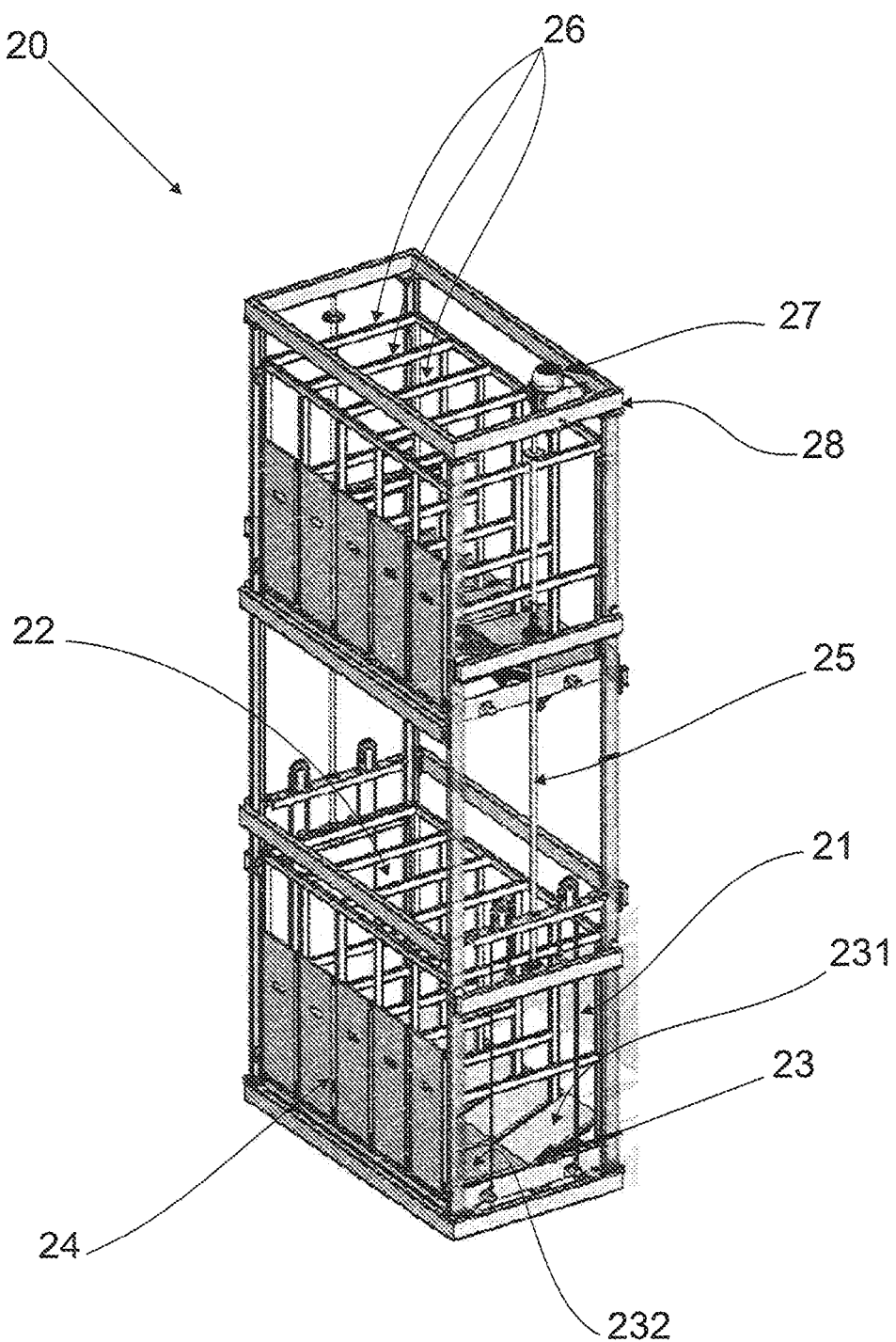
FIG. 2—is a schematic view of the elevator that makes up the storage device subject matter of this invention.
Figure 3:
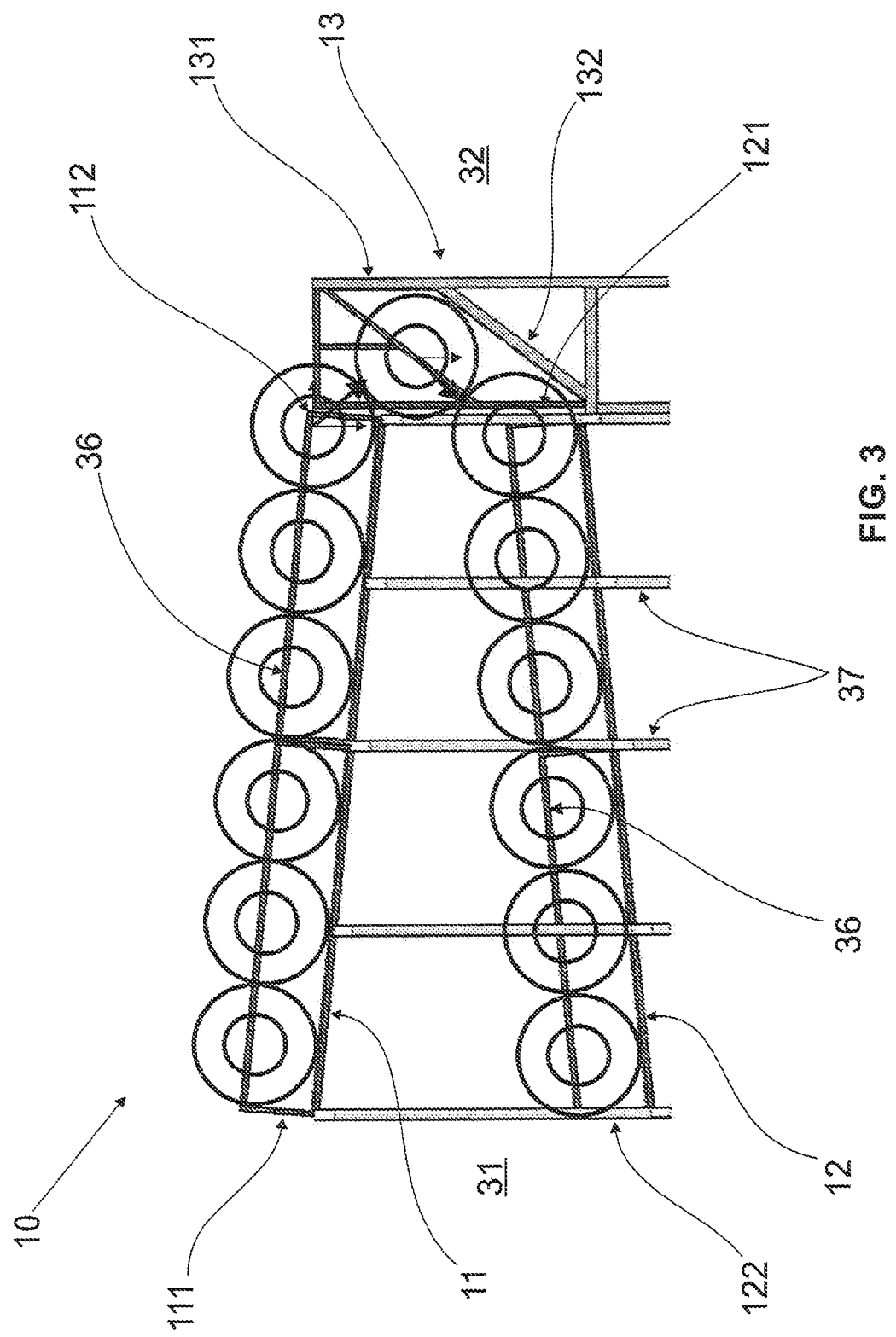
FIG. 3—is a schematic view of the tire storage device subject matter of this invention.

According to a preferred embodiment, as shown in FIGS. 1-3, the tire storage device (30), subject matter of this invention, comprises a front portion (31) and a rear portion (32), wherein a plurality of storage niches (10) are placed between them. Adjacent the front portion (31) there is at least one elevator (20) engaging the plurality of storage niches (10), as described below.

Each storage niche 10 comprises an inclined upper platform (11), an inclined lower platform (12), and a connecting platform (13), which is also inclined. The connecting platform (13) associates the upper platform (11) with the lower platform (12) forming two levels, so that the upper platform (11) and the lower platform (12) are parallel to each other.

The inclination of the upper platform (11) is preferably 2.5°, while the slope of the lower platform is preferably 5°, wherein both platforms may have different inclination as long as the tire storage function is not impaired.

The upper platform (11) and the lower platform (12) are one-piece, that is, are made of wood, steel, wire steel, among other materials, preferably planar and forming a single piece covering the entire extent formed between the front portion (31) and the rear portion (32), such as a large two-story shelf. The plurality of niches (10) consists of a plurality of rectilinear guides (36), of adjustable length depending on the length of the platforms and accompanying the inclinations of such platforms. These guides (36) are arranged side by side, parallel to each other, spaced apart from each other according to the sizes of the tires to be stored. Wide tires require greater spacing between the guides (36) on the platforms, while narrower tires allow guides (36) to be placed closer to each other. This entire structure is supported by multiple columns (37) arranged equidistantly from each other along the area covered by the platforms (FIG. 1).

As shown in FIG. 3, the upper platform (11) comprises an inlet end of tire of the (111) that cooperates with the elevator (20), and a second end (112), opposite the inlet end of tire (111) that cooperates with the connecting platform (13).

Likewise, the lower platform (12) comprises a first end (121) which cooperates with the connecting platform (13) and an outlet end of the tire (122), opposite the first end (121). The inlet end of the tire (111) of the upper platform (11) and the outlet end of the tire (122) of the lower platform (12) are arranged adjacent to the front portion (31) of the device (30), namely, both tire entrance and tire exit occur from the same side, namely the front portion (31) of the device (30). This reduces the amount of loss of specific conditions related to shape tolerance, design chemical composition and exposure to contaminants for storage/stocking, temperature and humidity due to multiple ports and through openings.

Still according to FIG. 3 and as already described, the connection of the upper platform (11) with the lower platform (12) is made by the connecting platform (13). This connecting platform (13) is consists of a first segment (131) arranged vertically and in the proximity of the second end (112) of the upper platform (11) and of a second segment (132), arranged inclined from the first segment (131) and towards the first end (121) of the lower platform (12). The first and second segments (131, 132) of the connecting platform (13) form two angles of fall, providing the movement of the tires using only the action of gravity.

This is because, as shown in FIG. 3, the tires are arranged on the upper platform (11) and the lower platform (12) so that the resulting vector (R) of the forces (F) applied to a previous tire is always greater or higher relative to the subsequent tire, and therefore, the movement of the tires is guaranteed by the action of gravity. The rubber grip guarantees the turning of the tire in the center of gravity of each tire, reducing the risk of deformation by static storage and ensuring the movement of the tires to the exit point for use.

According to FIG. 2, the elevator (20) comprises a compartment (21) for placing at least one tire and preferably five tires. This compartment (21) consists of a cage structure (22) containing at least one and preferably five hoisting positions separated by secondary guides (26) having width coinciding with the width of the storage niche (10). Each hoisting position receives one tire.

Furthermore, the cage structure (22) comprises a floor (23) consisting of a first segment (231) and a second segment (232) which are pivotable in order to ensure the stability of the tire during hoisting and the transition from the elevator (20) to the storage niches (10) without the need to use a motor.

Figure 4A:
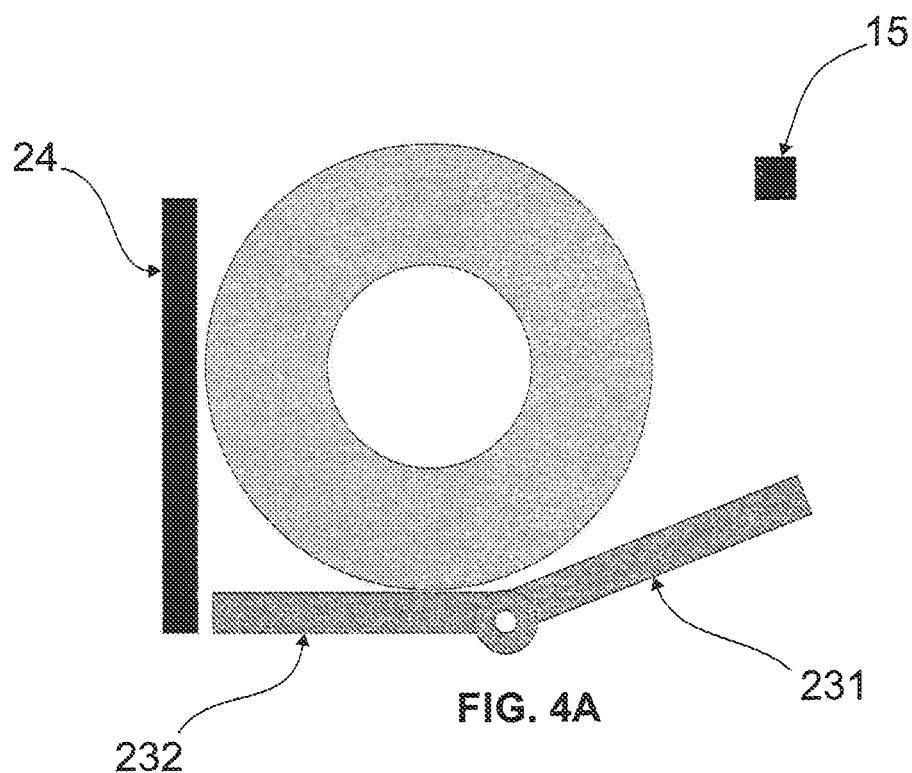
FIGS. 4A and 4B—are schematic view of the cooperation between the elevator and the storage niche that make up the storage device subject matter of this invention.
Figure 4B:
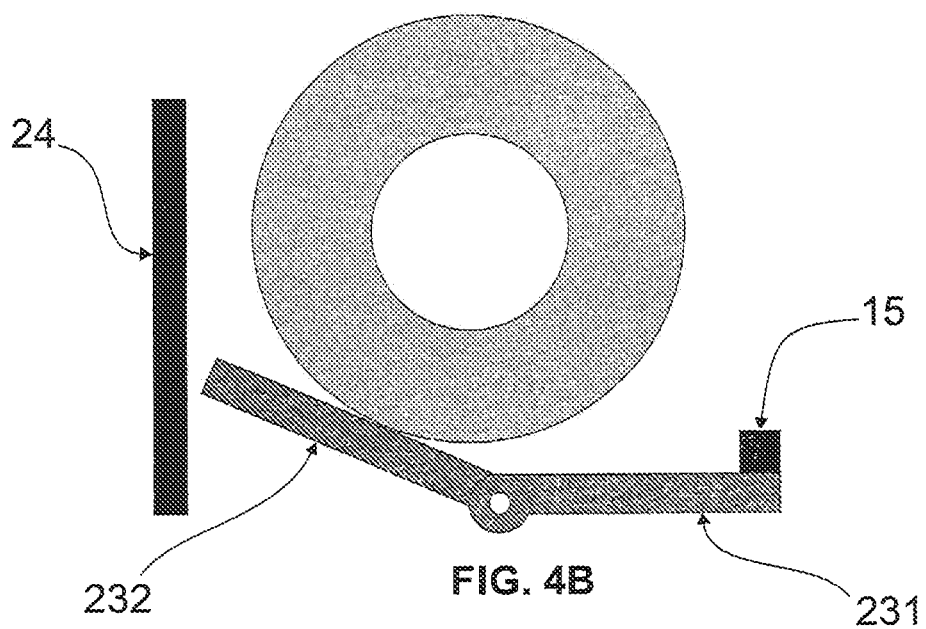

More specifically, as schematically illustrated in FIGS. 4A and 4B, the tires are placed in the hoisting positions through supply ramps (24) which are in the horizontal position for the passage of the tires and in the vertical position once all the tires are placed in the hoisting positions, preventing the return on the tires. At this time, when the tires are in the hoisting positions, the tires are placed on the second segment (232) of the floor (23). With the weight of the tire on this second segment (232), the first segment (231) of the floor (23) is pivoted so as to tilt and ensure stability of the tire during hoisting (FIG. 4A).

As the compartment (21) reaches the height of the tire inlet ends (111) of the storage niches (10), the first segment (231) of the floor (23) encounters a fixed stop (15) of the upper platform (11) (FIG. 4B) which causes it to be pivoted to the horizontal position. Simultaneously, the second segment (232) of the floor (23) is also pivoted so that its free end lifts leading the tire out of the elevator (20) and into the storage niches (10).

The cage structure (22) containing the tires is lifted from a first lower position to a second upper position by means of a spindle (25) driven by an electric motor (27) arranged in the roof (28) of the elevator (20), minimizing the risk of contact with the operator and minimizing the risk of accident.

The elevator (20) also moves linearly along the front portion (31) of the device (30). This displacement takes place on rails arranged on the floor (not shown), arranged perpendicularly in relation to the platforms of the storage niches (10).

The operation of the device (30) occurs with the provision of large tires to the storage niches (10). To this end, the tires are placed in the elevator (20) in an upright position, through the supply ramps (24), housed in the hoisting positions, inside the cage structure (22). At this time, the supply ramps (24) are retracted to the upright position, preventing the return of the tires.

With the weight of the tire on this second segment (232) this segment is held in the horizontal position while the first segment (231) of the floor (23) is pivoted and positioned in the inclined position, giving stability to the tires while being lifted. The compartment (21) is hoisted through the motor (27) which drives the spindle (25) until the compartment (21) reaches the desired height which is the height of the tire inlet ends (111) of the storage niches (10). As the housing (21) reaches this desired height, the first segment (231) of the floor (23) encounters a fixed stop (15) of the upper platform (11) which causes the first segment (231) to pivot until it returns to its horizontal position. Simultaneously the second segment (232) is also pivoted at the arrival of the housing to the desired height, lifting its free end while simultaneously withdrawing the tires from inertia, impelling them to a rectilinear movement so that each of them leaves the cage structure (22) and enters the forward storage niche (10).

Once in the storage niches (10), the tires are rolled by the inclinations of the upper platform (11), then by the connecting platform (13), following the lower platform (12), always due to the action of gravity, until they reach the tire outlet end (122) of the lower platform (12).

Once it reaches the tire outlet end (122), the tire of interest is always removed at the level closest to the ground and always in the upright position of use, thereby minimizing the accident rate by changing the tire orientation. Moreover, the tire-operator interaction is minimal, therefore eliminating the ergonomic risks for the operator.

The arrangement of the device (30), subject matter of this invention, by independent rows and columns, ensures that the first tire entering the stock is the first tire to exit. This condition is critical to ensure tire traceability.

To this regard, in the preferred embodiment described above, the upper platform (11) and the lower platform (12) consist of a single base on which the guides (36) are positioned parallel to each other forming the storage niches (10). Optionally, the storage niches (10) may be independent and modular, having adjustable length and width Thereby, the tire storage device (30) has the advantage of allowing: (i) FIFO (First in first off) control, (ii) an increase in storage/stocking capacity by 318%, (iii) a drastic reduction in the risk of accidents.

Furthermore, the device (30) allows tire position change, removal and supply always near the outlet door, reduces manual handling of the tires within the stock, eliminates the need to construct new facilities, avoids container rental, eliminates the need for rent or purchase of forklifts and eliminates the need for training how to operate it.

Although only one preferred embodiment has been described, it must be understood that the scope of the instant invention covers other possible alternatives and that it is limited only by the content of the claims, the possible equivalents being included therein.

The invention claimed is:

1. A tire storage device for organized storage of a series of tires to allow the tires to be sequentially discharged from the device in a first-in, first-out (FIFO) order, wherein the tire storage device comprises:
   a plurality of tire storage niches arranged in parallel rows between front and rear portions of the device, wherein each of the tire storage niches defines an upper tire inlet and a lower tire discharge at the front portion of the device, and
   a tire elevator assembly laterally moveable along the front portion of the device adjacent to the upper tire inlet and lower tire discharge of the plurality of tire storage niches, wherein
   each tire storage niche includes:
   (i) an upper platform having a forward end which includes the upper tire inlet and a rearward end opposite the forward end, the upper platform having a fixed stop at the forward end thereof and being downwardly inclined between the forward and rearward ends to allow tires on the upper platform to roll from the front portion towards the rear portion of the device,
   (ii) a lower platform having a first end and a second end which includes the lower tire discharge opposite to the first end, the lower platform being downwardly inclined between the first and second ends to allow tires on the lower platform to roll from the rear portion towards the front portion of the device, and
   (iii) a connecting platform operatively associating the upper platform with the lower platform to allow tires arriving at the rearward end of the upper platform to be transferred by gravity onto the first end of the lower platform, and wherein
   the tire elevator assembly comprises:
   a cage structure defining a plurality of laterally adjacent tire receiving compartments each for receiving a tire therein; and
   a lift mechanism to lift the cage structure from a lowered position wherein each of the tire receiving compartments is positioned adjacent to a lower tire discharge of a respective tire storage niche, and a raised position wherein each of the tire receiving compartments is positioned adjacent the upper tire inlet of the respective tire storage niche; wherein
   each of the tire receiving compartments includes a forward and rearward floor segments angularly extending relative to one another from an intermediate portion of the floor member, wherein the floor member is pivotally connected to the cage structure at the intermediate portion thereof so as to allow pivotal movements of the floor member between tire loading and unloading conditions; and wherein
   the forward floor segment is lowered when the floor member is in the tire loading condition to allow a tire to be placed within a respective tire receiving compartment while the rearward floor segment is upwardly displaced so as to retain the tire within the respective tire receiving compartment as the cage assembly is moved from the lowered position and into the raised position by the lift mechanism, and wherein
   the rearward floor segment engages the fixed stop at the forward end of the upper platform in response to the cage assembly being moved into the raised position which responsively causes the floor member to be pivoted about the intermediate portion thereof and thereby moved into the tire unloading condition such that the forward floor segment is upwardly displaced while the rearward floor segment is lowered and aligned with the tire inlet of the upper platform to allow the tire within the respective tire receiving compartment to roll out of the respective tire receiving compartment and onto the upper tire platform at the tire inlet thereof.

2. The tire storage device according to claim 1, wherein the upper platform is downwardly inclined at an angle of 2.5° between the forward and rearward ends thereof, and the lower platform is downwardly inclined at an angle of 5° between the first and second ends thereof.

3. The tire storage device according to claim 2, wherein the upper platform and the lower platform are one-piece planar platform elements, and wherein the plurality of storage niches further includes a plurality of rectilinear guides of adjustable width and length that are arranged side by side, parallel to each other.

4. The tire storage device according to claim 1, wherein the connecting platform comprises a vertical first segment separated from the rearward end of the upper platform, and a second segment joined to a lower portion of the first segment which is downwardly inclined from the first segment and towards the first end of the lower platform.

5. The tire storage device according to claim 4, wherein the first segment and the second segment of the connecting platform forms two angles of fall for the tires such that a vector (R) resulting from forces (F) applied to a previous tire is located above a subsequent tire.

6. The tire storage device according to claim 1, wherein the lift mechanism comprises a spindle operatively connected to the cage structure and a motor operatively connected to the spindle, wherein operation of the motor causes the spindle to lift the cage structure from the lowered position to the raised position.

7. The tire storage device according to claim 1, wherein the device further comprises rails positioned along the front portion of the device, and wherein the tire elevator assembly is operatively associated with the rails so as to be laterally moveable along the front portion of the device.

* * * * *